(12) United States Patent
Armand et al.

(10) Patent No.: US 6,743,877 B1
(45) Date of Patent: Jun. 1, 2004

(54) ELECTRODE MATERIALS DERIVED FROM POLYQUINONIC IONIC COMPOUNDS AND THEIR USE IN ELECTROCHEMICAL GENERATORS

(75) Inventors: Michel Armand, Montreal (CA); Christophe Michot, Grenoble (FR); Nathalie Ravet, Montréal (CA)

(73) Assignees: ACEP Inc, Montréal (CA); Centre National de la Recherche Scientifique (CNRS), Paris (FR); Université de Montréal, Montréal (CA)

( * ) Notice: Subject to any disclaimer, the term of this patent is extended or adjusted under 35 U.S.C. 154(b) by 0 days.

(21) Appl. No.: 09/361,962

(22) Filed: Jul. 28, 1999

Related U.S. Application Data

(63) Continuation of application No. PCT/CA98/01125, filed on Dec. 2, 1998.

(30) Foreign Application Priority Data

Dec. 2, 1997 (CA) .............................................. 2223562

(51) Int. Cl.[7] ................................................ C08F 26/06
(52) U.S. Cl. ...................... 526/258; 526/256; 526/259; 429/209
(58) Field of Search ................................ 526/259, 256, 526/258; 429/209, 12

(56) References Cited

U.S. PATENT DOCUMENTS 5,512,391 A * 4/1996 Fleischer ..................... 429/213
5,637,452 A * 6/1997 Speck ........................... 435/4

FOREIGN PATENT DOCUMENTS

| CH | 657 862 A5 | 2/1983 |
| FR | 2 465 325 | 8/1980 |
| GB | 1115335 | * 7/1965 |

OTHER PUBLICATIONS

Tsutsumi et al., Journal of Colloid and Interface Science, 185, 432–435 (1997).*

Tsutsumi et al., Journal of Power Sources, 68, 735–738 (1997).*

Kotek et al., Journal of Polymer Science: Polymer chemistry Edition, 12, 2837–2841 (1983).*

Pletcher et al., Journal of Polymer Science: Polymer Chemistry Edition, 18, 643–660 (1980).*

The Merck Index, 1996, Merck Research Labs, Whitehouse Station, NJ USA, compoound 8447 p. 1426.

The Merck Index, 1996, Merck Research Labs, Whitehouse Station, NJ USA, compound 5743 p. 973.

* cited by examiner

*Primary Examiner*—Ling-Siu Choi
(74) *Attorney, Agent, or Firm*—Katten Muchin Zavis Rosenman

(57) ABSTRACT

The present invention is concerned with novel compounds derived from polyquinonic ionic compounds and their use in electrochemical generators.

2 Claims, No Drawings

ELECTRODE MATERIALS DERIVED FROM POLYQUINONIC IONIC COMPOUNDS AND THEIR USE IN ELECTROCHEMICAL GENERATORS

This application is a continuation of a of PCT/CA 98/01125 filed Dec. 2, 1998.

FIELD OF THE INVENTION

The present invention is concerned with novel polyquinonic ionic compounds useful as electrode materials used for example in electrochemical generators.

BACKGROUND OF THE INVENTION

Electrode materials derived from transition metals, in particular transition metals binary chalcogenides, such as $TiS_2$, $VO_x$ ($2 \leq x \leq 2,5$), ternary oxides such as $LiNiO_2$ $LiCoO_2$, $Li_{1+x}Mn_{2-x}O_4$($0 \leq x \leq 1$), et $LiV_3O_8$, are known. These materials are however often relatively toxic. With the exception of vanadium derivatives, the capacities are practically modest, i.e. on the order of 100 $Ah.g^{-1}$, and their potential (about 4 V vs $Li^+/Li°$) are beyond the domain of stability of solid or liquid electrolytes. They are therefore problematic in terms of safety.

Organic compounds like conjugated polymers work through an insertion mechanism of anions taken from the electrolyte. The mass capacities resulting therefrom are consequently low and the cycling possibilities are disappointing.

Other known compounds are those of the polydisulfide type, which, even if they do not have intrinsic electronic conductivity, possess interesting redox properties and mass capacities (($\geq 300$ $Ah.g^{-1}$), particularly oxidizing coupling derivatives of 2,5-dimercaptothiadiazole. However, the resulting reduction products and intermediates are lithium salts like conjugated thiolates with a nitrogen atom. Delocalization of the charge on the polarisable anionic centers like sulfur and nitrogen, lead to a relatively important solubility in the electrolytes, as well as a reduced cycling life span.

Monoquinones are organic compounds known for their redox properties, but the potentials are of little interest (on the order of 2.2 V vs. $Li^+/Li°$), and the neutral oxidized compounds are soluble in the electrolytes. Polymers bearing quinonic functions such as those resulting from hydroquinone and formaldehyde polycondensation, are not electrochemically active because of the reduced mobility of the charge carriers, ions and electrons, in the absence of highly polar protic solvents like water.

SUMMARY OF THE INVENTION

The present invention concerns electroactive compounds derived from anion salts bearing at least 2 quinone functions cumulated, conjugated, or both, in the same molecule. More specifically, the invention comprises a redox compound having at least one state of oxidation state represented by the general formula:

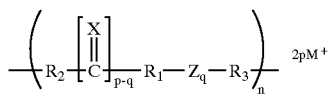

wherein $M^+$ represents an alkaline metallic cation, an alkaline-earth cation, a transition metal cation, a rare earth cation, an organometallic cation, an organic cation of the "nium" type, a repetitive unit of a cationic oxidized conjugated polymer, or a monomeric or polymeric cation optionally having a redox character;

X is oxygen, NCN, or $C(CN)_2$;

Z is C—$Y^-$ or $N^-$;

Y represents oxygen, sulfur, NCN, —$C(CN)_2$, with the proviso that when Y is sulfur and n is $\leq 4$, then X is oxygen;

$R_1$ is absent, O, S, NH, —(C=C)$_r$—, —(W=W)$_r$— wherein W is independently $CR^6$ or N; r varies between 1 and 12; and $R^6$ is H, halogen, CN, or $C_{1-12}$ alkyl, $C_{2-12}$ alkenyl or $C_{6-14}$ aryl optionally having one or more substituents oxa, aza or thia; and wherein 2 $R^6$ groups can be bonded to form a cycle comprising from 3 to 7 members;

$R^2$ and $R^3$ are the same or different and are absent, a carbonated divalent radical, optionally substituted with aza, oxa or thia;

q varies between 0 et p;

p varies between 1 and 5;

n varies between 1 and $10^4$; and wherein two of $R^1$, $R^2$ and $R^3$ can be bonded together to form a cycle comprising 3 to 7 members.

For the purposes of the present invention, when n is 4 or less, the compound of the invention is not considered a polymer. In addition, the expression "divalent radical" is defined as an alkylene, an arylene, or an arylalkylene of from 2 to 200 carbon atoms, and optionally comprising one or more substituents aza, oxa or thia.

The present application further concerns an electrode material characterized in that it contains, in whole or in part, a compound of the invention, and an electrical energy storage system such as a primary or secondary generator or a super capacity comprising an electrolyte, at least one negative electrode and at least one positive electrode comprising a compound of the invention.

DETAILED DESCRIPTION OF THE INVENTION

In the present invention, a new family of electroactive compounds derived from anion salts bearing a plurality of quinone functions cumulated and/or conjugated in the same molecule is described and claimed. It has been found that such type of compounds have a high capacity, i.e. equal or higher than 300 $Ah.g^{-1}$, obtained at potentials comprised between 3.5 et 1 V vs. $Li^+/Li°$, thus in the domain of stability of conventional aprotic electrolytes, liquid or solid, and allowing the making of positive and negative electrodes for generators. Further, the corresponding salts do not, whatever their degree of oxidation, solubilize significantly in liquid electrolytes or aprotic polymers. The kinetic of theredox reaction in solid phase is noticeable and comparable to that of inorganic insertion materials. It has also been found that by replacing the oxygen atom of the neutral quinonic groups CO with NCN groups or $C(CN)_2$, and/or the replacement of the oxygen atom of the quinonic groups negatively charged with anionic groups $N^-$, $NCN^-$ or $C(CN)_2^-$ had the same interesting properties in terms of the redox activity. The redox potential is displaced of about 300 mV towards the positive values by replacing a neutral quinonic oxygen with an NCN or $C(CN)_2$. The chemical methods to perform these substitutions on the quinonic groups are well known to anyone of ordinary skill in the art.

The redox compounds of the present invention include also polyquinones wherein the negatively charged oxygen of the quinonic groups is replaced with sulfur S⁻. In this case, charge conjugation with an oxygenated group CO neutral and weakly polarisable and more electronegative, significantly lowers the solubility of the corresponding ionic derivatives, in particular in electrolytic solutions. An additional degree of oxidation is then obtained by oxidative duplication of CS⁻ groups to form disulfide bridges CS—SC.

These polyquinonic compounds can also be part of the polymers into which the charges are conjugated along the polymeric chain. In such a case, the solubility of these rigid macromolecules is null, whatever the charge borne by the polymer, thus including the neutral state.

Because the compounds of the present invention are anion salts, i.e., negatively charged, it is necessary to combine them with a cation in order to have a global neutral charge. The preferred cations comprise the proton, alkaline cations like Li, Na, K, Cs; alkaline-earth cations like Mg, Ca, Ba; transition metal cations like Cu, Zn, Pb, Fe, Ni, Co, Mn, V, Cr; rare earth cations; organometallic cations like metallocenium; cations of the <<ium>> type such as ammonium, amidinium, guanidinium, pyridinium, imidazolium, triazolium, imidazolinium, sulfonium, phosphonium, iodinium; a repetitive unit of an oxidized cationic conjugated polymer such as polypyrrole, polythiophene, polyquinolines; cations in the form of monomers or polymers optionally having a redox character such as viologenes of formula $[-(R"NC_5H_4-C_5H_4N-)^{2+}]_n$ wherein R" comprises $C_{2-12}$ alkylene, $C_{6-14}$ arylene or $C_{6-14}$ arylene $C_{2-12}$ alkylene, each optionally substituted with oxa, aza ou thia. The lithium cation and the proton are particularly preferred. Other ions can be present in the electrolytic medium and/or in the electrode material, and can contribute to improve the conductivity of the interfacial properties. The potassium ion is advantageously used in such instance, as well as cations derived from quatemized imidazoliumn.

To the redox capacity of the molecules of the present invention can be added that of the cation when the latter possesses many degrees of oxidation. Cations of iron, copper or manganese, as well as metallocenes, are particularly interesting for such application. Organic cations with redox properties, such as viologenes, are similarly useful. These cations can optionally be part of a polymeric chain.

The compounds of the present invention possess high specific capacities of redox exchange, and in fact superior to those of conventional inorganic compounds. The great variety of functional groups available allows choosing redox potentials in a wide range of potentials, typically between 0.1 to 3.7 V vs. $Li^+/Li^\circ$. Compounds with redox couples comprised between 0.1 and 2 V vs. $Li^+/Li^\circ$ are advantageously used as a component of negative electrodes in electrochemical generators of primary and secondary type batteries or supercapacitor. Similarly, compounds with redox couples comprised between 2 and 3.7 V vs. $Li^+/Li^\circ$ are advantageously used as component of positive electrodes in same devices or as an active or passive electrode in electrochromic devices.

The compounds of the present invention can be used alone or in mixtures thereof They can also be used in conjunction with other redox compounds, in particular insertion compounds. Such insertion compounds include, for negative electrodes, metallic lithium or alloys thereof, optionally in the form of a nanometric dispersion in lithium oxide; double nitrides of lithium and a metal of transition such as cobalt; oxides with a low potential of general formula $Li_{1+y}Ti_{2-x/4}O_4$ wherein x and y vary between 0 et 1; and carbon and carbonated products resulting from the pyrolysis of organic matters. For the positive electrodes, the insertion compounds include oxides and sulfides of transition metals, such as $VO_z$ wherein z varies between 2 and 2.5; $LiV_3O_8$; $Li_aN_{1-a}Co_aO_2$ wherein a varies between 0 et 1; manganese spinels $Li_yMn_{2-x}M_xO_4$ wherein x varies between 0 and 0.5 and y varies between 0 and 2, and M is Li, Cr, Al, V, Ni; organic polydisulfides; FeS; $FeS_2$; iron sulfate; iron and lithium phosphates and phosphosilicates of the olivine structure; or the substitution product of iron with manganese, either used alone or in mixtures.

The materials of the invention are particularly embodied in composite electrodes containing the novel redox compounds, alone or in mixtures, at least one electronic conductor, and at least one polymeric binder. The electronic conductors are preferably selected from carbonated compounds such as carbon black, graphite powder, products resulting from the pyrolysis of organic matters, in particular phenolic resins or polyacrylonitrile. When the electrode binder does not have any electrochemical function but only a mechanical function, the latter is advantageously chosen from non-polar polymers like polytetrafluoroethylene, co- or ter-polymer of ethylene, propylene and a diene, that allow the binding of the materials while leaving a porosity sufficient to permit the required electrolyte penetration for proper operation of these redox materials.

Liquid electrolytes suitable with such type of redox materials are those obtained by dissolving a salt or an acid in a solvent. The solvents are preferably chosen from cyclic or acyclic carbonates, γ-butyrolactone, monoalkylamides and di-alkylamides, tetraalkylsulfamides, dialkylated ethers of mono, di, tri and tetraethylene glycols, as well as oligomers having a mass lower than 2000 g/mole, and their mixtures.

In a variation, the electrode binder has an ionic conductivity and allows the maintenance of an intimate contact between the particles of the redox materials in the electrolyte while compensating, because of their plastic or elastomeric character, for the variations of volume inherent to the operation of the electrode. In preferred embodiments, the electrolyte contains, individually or in a mixture, a polar-type polymer, a polar solvent, and/or at least one ionic salt. The polar-type polymers useful with the addition of a liquid solvent are preferably selected from vinylidene fluoride-based homo- or copolymers, acrylonitrile-based homo- or copolymers, methyl methacrylate-based homo- or copolymers. The polar-type polymers useful with or without the addition of a liquid solvent are preferably selected from polyethers such as ethylene oxide-based or propylene oxide-based homo- or copolymers. In a variation of the preferred embodiment of the compounds of the invention, ceramic or cross-linked particles are added to the polymer electrolytes, to improve the mechanical properties.

Another interesting aspect of certain compounds of the invention is their possibility to give, after oxidation beyond the normal reversible operating potential, an irreversible reaction liberating lithium ions and gaseous compounds such as carbon monoxide or carbon dioxide, nitrogen, ethylene or acetylene and their polymers. These products are eliminated from the generator medium (gas) or are inactive (polymers), and provide exceeding capacity that is useful to compensate for the loss of capacity equilibrium between the anode and the cathode, caused mainly by the appearance of a passivation layer during the first operating cycles of the generator.

The following anions are illustrate compounds of the present invention, and should not be considered as limiting its scope.

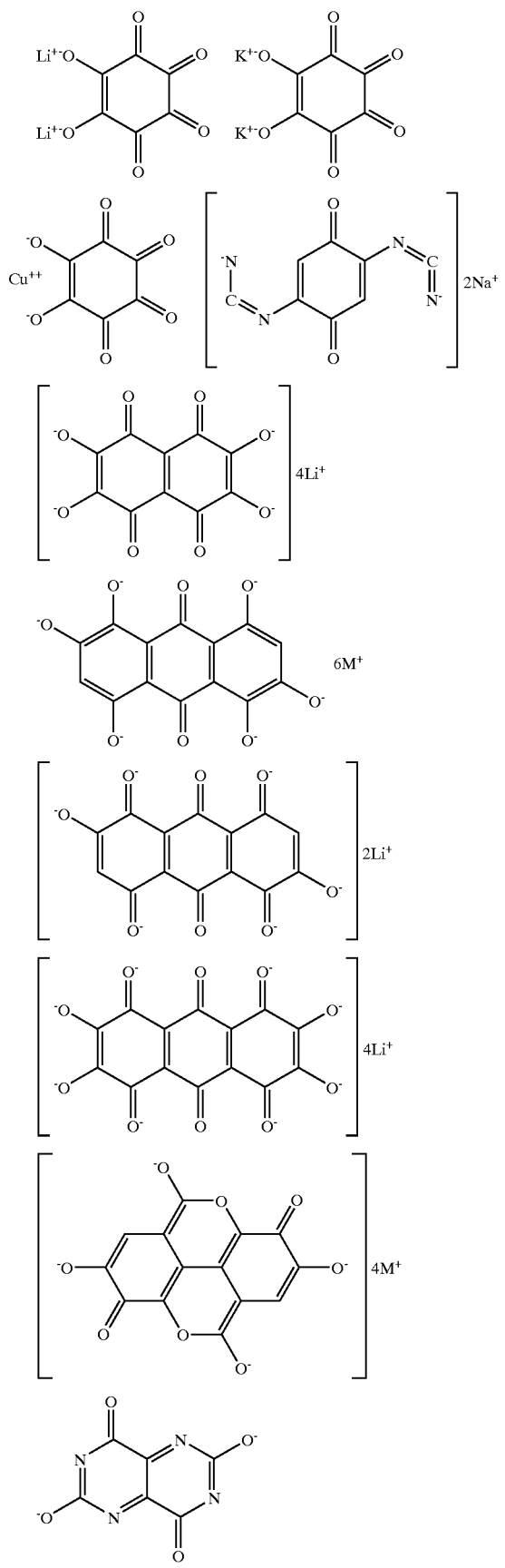
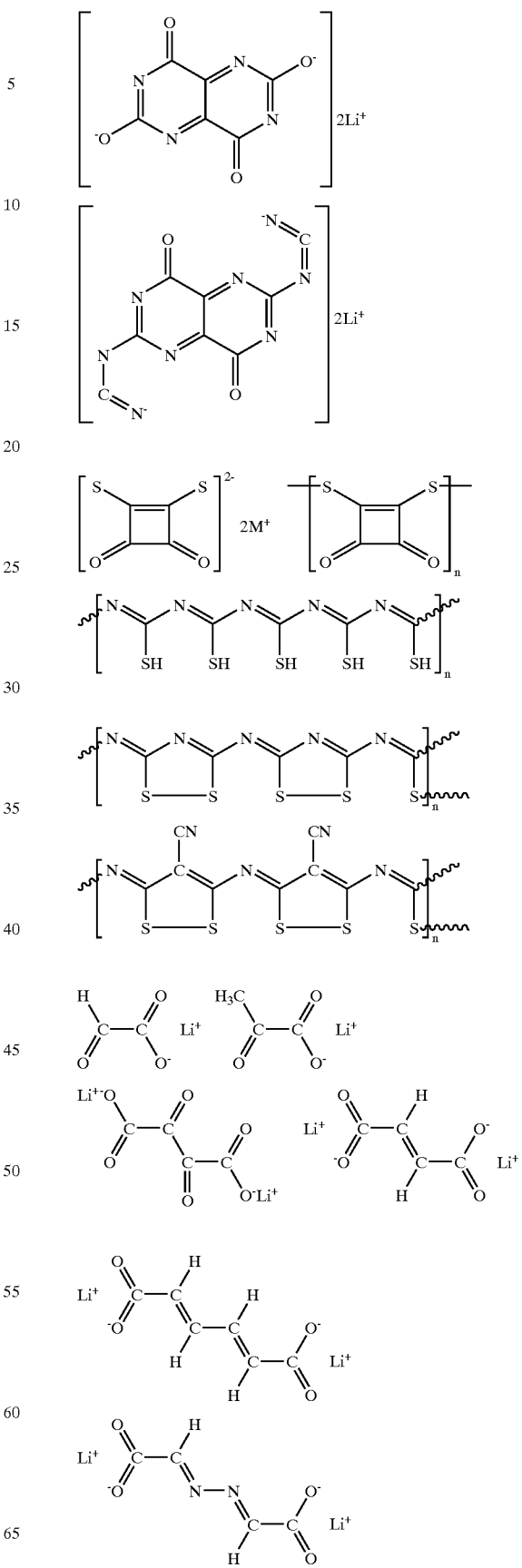

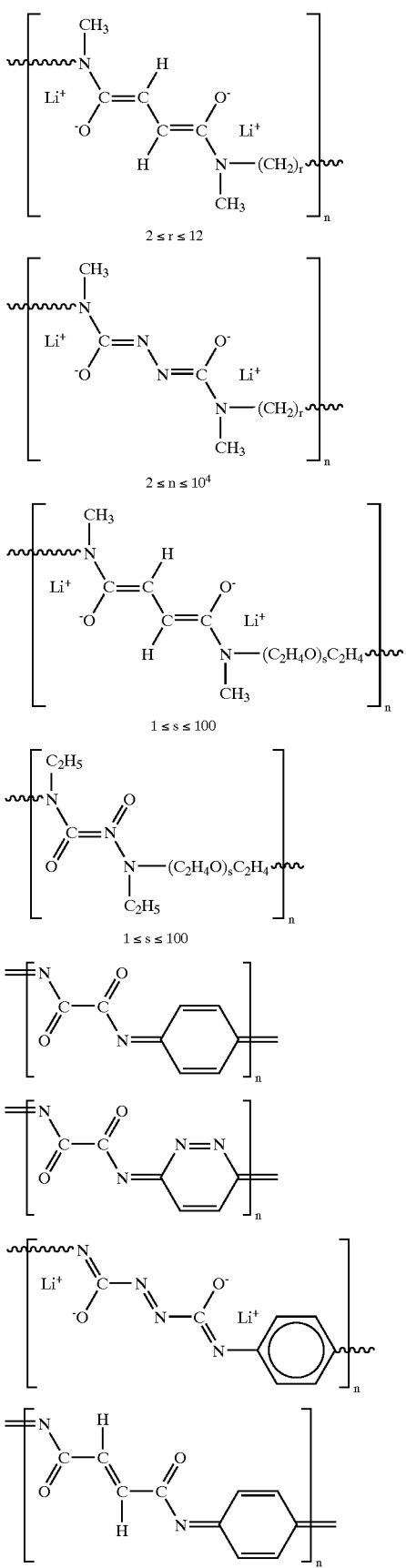

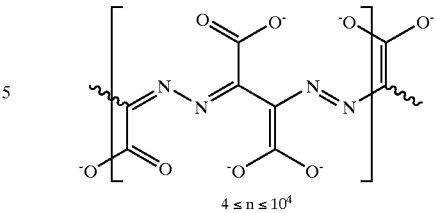

-continued

The following examples are provided to illustrate preferred embodiments of the present invention, and should not be considered as limiting its scope.

EXAMPLE 1

2.10 g of dihydrated rhodizonic acid (Lancaster Windham) are treated with 839 mg of monohydrate lithium hydroxide in isopropanol. The suspension is filtered and the black precipitate is dried under primary vacuum at 50° C., to give the following lithium rhodizonate:

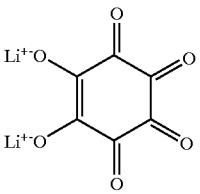

EXAMPLE 2

A lithium battery is fabricated with a film of lithium of a thickness of 30 mm, a polymer electrolyte made of a complex of ethylene polyoxide of a mass of 9×104 and lithium bis-trifluoromethanesulfonylamide (LiTFSI) to obtain a ratio of the number of oxygens of the polymer on the lithium ions of 12:1. The solution in a common solvent is spread, evaporated and dried to form a film of a thickness of about 80 µm. The positive electrode comprises a mixture of 40% v/v of lithium rhodizonate as prepared in example 1, 5% by weight of carbon black (Ketjen black®) and 5% v/v of the electrolyte of the electrolytic composition previously described, but obtained with a polymer of a molecular weight of $10^5$. Acetonitrile is added to the mixture, and the suspension obtained is homogenized by agitation with zircon balls in a stainless steel recipient for 24 h. The electrode is obtained by spreading the suspension on a stainless steel disk of 1.6 cm diameter to form after evaporation of the solvent, a layer of a thickness of 60 mm. The battery assembled in a neutral atmosphere (helium <1 ppm $O_2$, $H_2O$) in the form of a battery-button by pressing the three components: anode-electrolyte-cathode and is tested at 80° C. in slow voltammetry with a digital potentiostat Macpile (®). Two domains of activity corresponding each to a capacity of 305 mAh.g$^{-1}$ are apparent at about 2.8 V and about 1.8 V with respect to the couple Li$^+$/Li°. For comparison purposes, the capacity of a manganese spinal based electrode $LiMn_2O_4$ possesses a theoretical maximum capacity of 153 mAh.g$^{-1}$ at 2.9 V and modifications of this compound, in order to limit the dissolution of the manganese, such as the composition $Li_{1.05}Mn_{1.85}Al_{0.1}O_4$, have a capacity of 115 mAh.g$^{-1}$.

EXAMPLE 3

Tetrahydroxybenzoquinone is treated with an excess of lithium isopropoxide in solution in isopropanol to give the lithium tetra-salt corresponding to the following reaction:

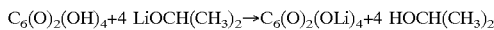

The black precipitate is filtered, dried and protected from exposure to air.

A "rocking chair" or "lithium ion-type" battery is fabricated by providing a graphite negative electrode (85% v/v) bonded with a copolymer of vinylidene fluoride and hexafluoropropene (PVDF), deposited on a thin sheet of copper (8 mm) and corresponding to a capacity of 3.1 mAh.cm$^{-2}$ for the composition LiC$_6$. The positive electrode is a mixture of carbon black of the Ketjen black type (7% v/v), lithium tetra-salt of tetrahydroxybenzoquinone (73% v/v) and PVDF (10%) deposited on an aluminum collector of 10 mm. The capacity of the positive electrode for a reversible exchange of two electrons per molecule is 3.5 mAh.cm$^{-2}$. The electrolyte is made of a 1M solution of LiPF$_6$ in a mixture of ethylene carbonate of 2-tertiobutoxyethyl-2'-methoxyethylether (50/50 v/v). The liquid is immobilized in a porous membrane (Celgard®) of a thickness of 25 mm. The battery is charged in an intentiostatic mode at 0.45 mAcm$^{-2}$ for 8 hours and the potential stabilizes at 3.6 V. The capacity extracted during discharge at C/5, i.e. 5 hours to extract the nominal capacity, is of 3.8 mAh/cm$^2$, and stable during cycling for over 100 cycles. The irreversible capacity of the first insertion of lithium in the carbon, which is necessary to the formation of a passivation layer, is obtained by over-oxidation of the lithium salt according the equation:

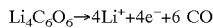

The reversible operation of the battery takes place according to the equation:

A generator identical to that of example 3 is fabricated by mixing two active compounds in the positive electrode, that is to say 0.9 mg/cm$^2$ of the lithium tetra-salt of tetrahydroxybenzoquinone and 16 mg/cm$^2$ of cobalt and lithium oxide LiCoO$_2$. The generator is charged at 4.2 V and its cycling capacity is 2.5 mAh.cm$^{-2}$, which corresponds to 96% of the capacity of the cobalt oxide alone.

EXAMPLE 4

Potassium rhodizonate K$_2$C$_6$O$_6$ (Fluka) is treated to make an electrochemical generator in the conditions similar to those of example 2. The capacity is 210 mAh.g$^{-1}$, which is 93% of the theoretical capacity, which is 225 mAh.g$^{-1}$.

EXAMPLE 5

Copper rhodizonate is prepared by reacting 3.5 g of dihydrated rhodizonic acid with 3.5 g of dihydrated copper acetate in methanol. After evaporation of the solvent and the acetic acid produced by the reaction, copper rhodizonate is dried at 110° C. under primary vacuum. The capacity obtained in a generator comprising a lithium anode and a gel-type electrolyte (45% copolymer of vinylidene fluoride and hexafluoropropene, 55% solution 1 M of LiBF$_4$ in γ-butyrolactone is of 450 mAh.g$^{-1}$ and corresponds to 94% of the theoretical capacity for 4 electrons between 3.3 et 2.5 V vs. Li$^+$/Li$^\circ$.

EXAMPLE 6

The compound

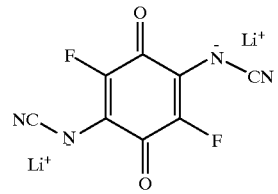

is obtained by reacting two equivalents of the lithium di-salt of the cyanamid Li$_2$NCN on tetrafluorobenzoquinone in DMF. The lithium fluoride is separated by centrifugation and the blue lithium salt corresponding to the above formula is precipitated in ether. This compound possesses a capacity of 235 mAh.g$^{-1}$ at 2.6 V vs. Li$^+$/Li$^\circ$.

EXAMPLE 7

Rufigallic acid is prepared according to the method of Robiquet (Ann. 19, (1836), 204) by condensing gallic acid in concentrated sulfuric acid. The hexasubstituted lithium salt is prepared by suspending rufigallic acid in THF under a neutral atmosphere and treatment with lithium isopropoxide. The resulting salt is filtered and dried under dry nitrogen. Oxidation to the diquinonic form is performed by treating 4.0 g of this compound with a stoichiometric amount of [bis(trifluoroacetoxy)iodo]benzene (10.18 g) in acetonitrile. After filtration and drying, the following compound is obtained:

This compound has a reversible capacity of 358 mAh.cm$^{-2}$ between 2.5 and 3.2 V vs. Li$^+$/Li$^\circ$.

EXAMPLE 8

1.40 g of trans-trans muconic acid (Sigma) are treated with 0.739 g of lithium carbonate in methanol. After evaporation and vacuum drying, a generator similar to that of example 2 is fabricated by using a cathodic mixture of 25% v/v of lithium muconate, 10% of Ketjen black and 65% of polyelectrolyte. The compound has a reversible capacity of 0.8 electron per formula at 1.3 V with respect to lithium. This compound can be used as a negative electrode in lithium-ion type batteries.

EXAMPLE 9

A polymer possessing conjugated azino functions (diazo in a reduced state) is prepared by action of 5 g of hydrazine monohydrate N$_2$H$_4$.H2O on the sodium salt of dihydroxytartric acid (22.6 g, Janssen Chemicals) in acetic acid, under agitation for 24 hours. The dark brown polymer is precipitated in isopropanol, separated by filtration and dried. The compound possesses redox properties of 2 electrons per repetitive unit of the polymer, that is to say a capacity of 290 mAh.g$^{-1}$. The lithium salt obtained by passage through an ion exchange column has a capacity of 360 mAh.g$^{-1}$. The formula of the polymer reduced to 50% of its capacity is:

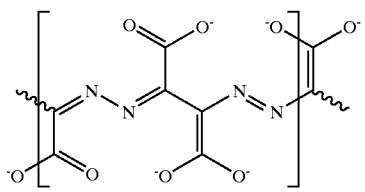

EXAMPLE 10

The potassium salt of dithiosquaric acid is prepared by reacting potassium hydrogenosulfide (14.43 g, Alpha) on dibutoxy-3,4-cyclobutane1,2-dione (22.62 g Aldrich) in ethanol. A yellow salt is obtained and recrystallized in a mixture water-ethanol, and is of formula:

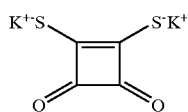

To 18 g of this salt in suspension in acetonitrile are added under mechanical agitation a solution of tetrabutylammonium tribromide (34.6 g) in acetonitrile. After one hour, the yellow precipitate is filtered and dried to give:

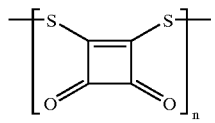

This compound possesses a reversible capacity of 385 mAh.g$^{-1}$ at an average potential of 2.8 V vs. Li$^+$/Li$^\circ$ and its solubility in electrolytes like propylene carbonate and its mixtures or the polymers solvating based on ethylene polyoxide is negligible, contrary to polydimercaptothiadiazole.

EXAMPLE 11

A Schiff polybase, poly(thiocyanic) acid, is prepared by reacting thiophosgene on thiourea in propylene carbonate in the presence of pyridine. The dark brown suspension is poured in 100 ml of water and the precipitate is filtered and washed with water. The product corresponds to the composition [C(SH)=N]$_n$ with a developed formula:

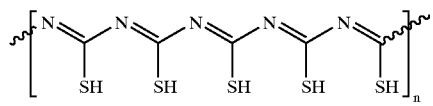

The polymer in its reduced form is oxidized by iodine in solution in acetonitrile in the presence of pyridine, and the suspension remaining is washed with acetonitrile until a colorless eluate is obtained. The brown-black powder corresponds to the oxidation of the thiol groups to give the polymer:

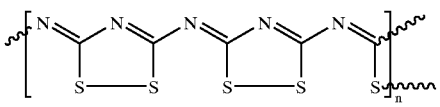

An electrochemical generator similar to that of example 2 using a positive electrode containing 40% v/v of the compound thus obtained shows a capacity of 360 mAh.g$^{-1}$ between 3 and 2.4 V vs. Li$^+$/Li$^\circ$, that is to say 75% of the theoretical capacity which is 478 mAh.g$^{-1}$.

EXAMPLE 12

In the same manner as in example 11, the alternate copolymer of formula:

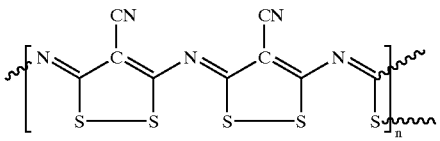

is prepared by replacing thiourea with the thioamide of cyanoacetic acid. The polymer obtained after oxidation is a black powder having a capacity of 555 mAh.g$^{-1}$, with 50% between 3.2 V and 2.4 V vs. Li$^+$/Li$^\circ$.

EXAMPLE 13

Tetraaminobenzoquinone is prepared according to the method of Wallenfel & al. (Ann. 1963, 667). 16.8 g of this compound and 2.46 g of chloranil (tetrachlorobenzoquinone) are mixed in a ball mill, and heated under argon at 250° C. in a Büichi TO51 oven followed by a treatment at 350° C. under vacuum. The compound obtained corresponds to the polyquinone-azine of formula:

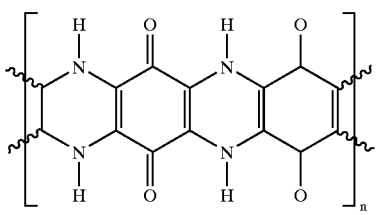

The lithium salt of this compound is obtained by treating a suspension of the polymer with a solution of lithium isopropoxide in isopropanol. This compound has a reversible capacity of 345 Ah.g$^{-1}$ between 2.4 and 3 V vs. Li$^+$/Li$^\circ$, that is to say 75% of the theoretical capacity which is 420 mAh.g$^{-1}$. The lithium salt of this polymer can also be obtained directly by reaction of tetrachlorobenzoquinone on lithium nitride in the molar ratio 1:2 by cogrinding in anhydrous DMF.

EXAMPLE 14

A polymer perfectly alternated between ethylene and carbon monoxide is obtained according to the method of Hiraguri et al. (*J. Am. Chem. Soc.*, 1987, 109, 3779). 56.06 g of this polymer are dissolved in hexafluoropropanol and treated with 10.39 g of lithium nitrite under reflux. The conjugated polymer appears under the form a black precipitate which is the lithium salt of formula:

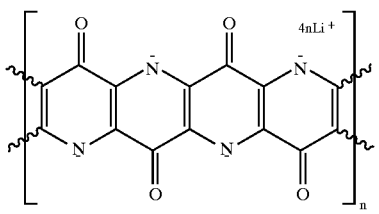

EXAMPLE 15

Azino(bisacetique) acid is prepared by reacting hydrazine hydrate in a stoichiometric amount with glyoxylic acid (Sigma) in isopropanol. The yellow-orange precipitate is dried and filtered, and the lithium salt is prepared in a solution methanol-water (50:50) by adding a stoichiometric amount of lithium carbonate. The salt is dried under vacuum and tested in conditions similar to those of example 7. This compound has a reversible redox activity at 1.7 V with respect to lithium.

EXAMPLE 16

A polymer of the polyamide type of formula:

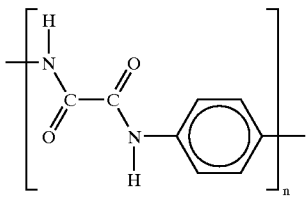

is obtained by polycondensation of methyl oxalate with 1,4-phenylene diamine in DMF. The reduced polymer is transformed in the oxidized quinoneimine form by reaction with bis[(trifluoroacetoxy)iodo]benzene in dichloromethane. The product has the developed formula:

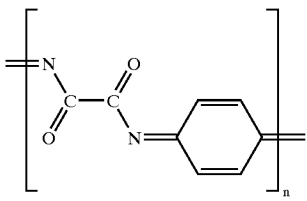

It has a redox couple at 2.7 V vs. $Li^+/Li^\circ$ for a capacity of 310 $mAh.g^{-1}$ (theoretical 347). Similar polymers are prepared by reaction of trifluoroethyl fumarate on 1,4-phenylene diamine (2.7 V vs. $Li^+/Li^\circ$) or oxalyl chloride on 3,6-diamino pyridazine (2.9 V vs. $Li^+/Li^\circ$).

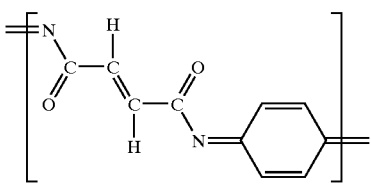

-continued

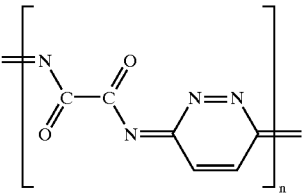

EXAMPLE 17

A redox polymer is prepared by condensing fumaryl chloride on N,N'-dimethylhexamethylenediamine in solution in DMF, in the presence of two equivalents of pyridine. The polymer is precipitated in water and purified by dissolution in acetone and reprecipitation in methanol. This polymer, mixed with carbon black, shows a redox activity at 1 V vs. $Li^+/Li^\circ$ for a capacity of 195 $mAh.g^{-1}$ (theoretical 247).

EXAMPLE 18

In the same manner as in Example 10, a redox polymer possessing an ionic conductivity and produced by the polycondensation of oxalyl-dlimidazole on 1,8-bis(methylamino)-3,6-dioxaoctane (Janssen) in DMF is prepared. This polymer also shows a redox activity at 1 V vs. $Li^+/Li^\circ$. At the neutral state, the polymer possesses complexing properties towards salts and an ionic conductivity facilitating the redox reaction. The structure of this polymer in a partially reduced state is

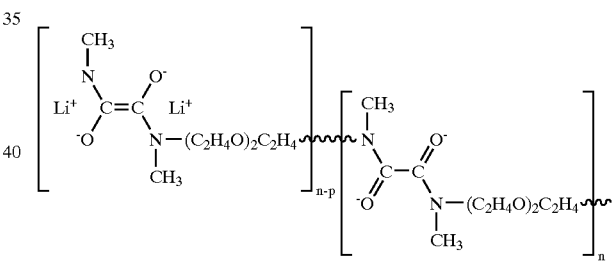

An amorphous copolymer can be obtained by using a mixture of the preceding amine with 1,5-bis(methylamino)-3-oxapentane. In the same manner, the oxalyl groups can be substituted with fumaryl or muconyl groups.

While the invention has been described in connection with specific embodiments thereof, it will be understood that it is capable of further modifications, and this application is intended to cover any variations, uses or adaptations of the invention following, in general, the principles of the invention, and including such departures from the present description as come within known or customary practice within the art to which the invention pertains, and as may be applied to the essential features hereinbefore set forth, and as follows in the scope of the appended claims.

What is claimed is:

1. A polymeric redox compound having at least one state of oxidation state represented by a formula selected from the group consisting of:

a polymer of thiocyanic acid or 1-cyano-2-mercaptoacetylene represented by the formula

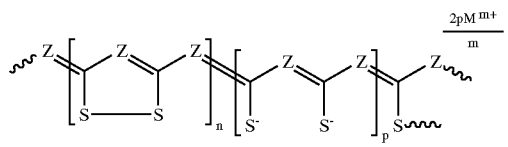

and its oxidation and reduction products, wherein:

Z=N or C—CN, n varies between 3 and $10^4$, p varies between 1 and 5, n varies between 1 and 10, $M^{m+}$ represents an alkaline metallic cation, and alkaline-earth cation, a transition metal cation, a rare earth cation, an organometallic cation, an organic cation of the "onium" type, a repetitive unit of a cationic oxidized conjugated polymer, or a monomeric or polymeric cation optionally having a redox character, and m represents the valence state of the cation, and a polymer containing units derived from keto-pyridine represented by the formula

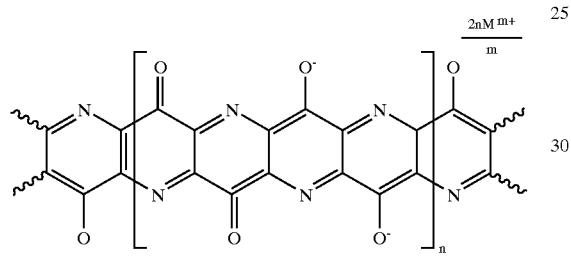

and its oxidation and reduction products.

2. A polymeric redox compound wherein the redox compound comprises a compound selected from the group consisting of:

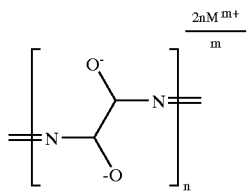

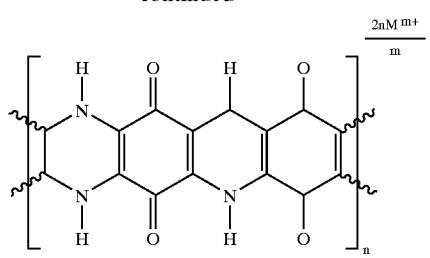

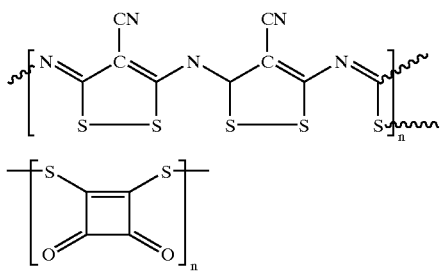

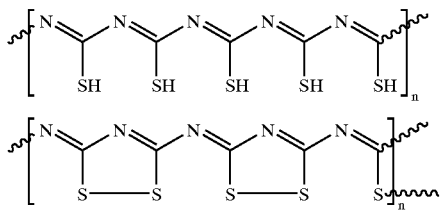

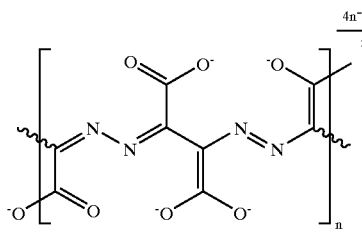

wherein n, m and $M^{n+}$ are as defined in claim 1.

* * * * *